United States Patent [19]

Pagowski et al.

[11] Patent Number: 4,815,726
[45] Date of Patent: Mar. 28, 1989

[54] QUICK RELEASE DOCUMENT TRANSPORT APPARATUS

[75] Inventors: Stefan J. Pagowski, Kitchener; Ralf M. Brooks; Dennis T. Sonnenburg, both of Waterloo, all of Canada

[73] Assignee: NCR Corporation, Dayton, Ohio

[21] Appl. No.: 137,636

[22] Filed: Dec. 24, 1987

[51] Int. Cl.⁴ .............................................. B65H 5/06
[52] U.S. Cl. ..................................... 271/274; 271/273
[58] Field of Search .................. 271/272, 273, 274; 235/484; 400/636, 637.1, 637.2, 637.3, 637.4, 637.5, 637.6

[56] References Cited

U.S. PATENT DOCUMENTS

| | | | |
|---|---|---|---|
| 2,965,374 | 12/1960 | Streeter | 271/80 |
| 3,576,163 | 4/1971 | Lawson | 101/233 |
| 3,618,934 | 11/1971 | Germuska | 271/274 |
| 4,030,726 | 6/1977 | Biedermann | 271/246 |
| 4,358,103 | 11/1982 | Koike et al. | 271/274 X |
| 4,369,959 | 1/1983 | Hornbuckle | 271/3.1 |
| 4,431,179 | 2/1984 | Westover et al. | 271/274 |
| 4,461,212 | 7/1984 | Geney | 101/407 R |
| 4,470,592 | 9/1984 | Takahashi | 271/273 |
| 4,482,148 | 11/1984 | Stewart, Jr. | 271/274 X |
| 4,607,837 | 8/1986 | Pierce | 271/273 |
| 4,630,815 | 12/1986 | Peterson et al. | 271/273 |

Primary Examiner—Joseph J. Rolla
Assistant Examiner—Edward S. Ammeen
Attorney, Agent, or Firm—Albert L. Sessler, Jr.

[57] ABSTRACT

A document transport apparatus which also provides for the quick release of a jammed document to facilitate its removal from the associated document track. First and second pinch rollers are mounted on a planar member which is moved, resiliently, into engagement with their associated first and second drive rollers. Slotted mounting members are used to mount the opposed ends of the planar member to one upstanding wall of the document track and to enable the planar member to move in a plane which is parallel to the document feeding direction. An operating lever is used to move the planar members with the pinch rollers thereon between engaged and disengaged positions with regard to associated drive rollers.

5 Claims, 2 Drawing Sheets

QUICK RELEASE DOCUMENT TRANSPORT APPARATUS

BACKGROUND OF THE INVENTION

This invention relates to a document transport apparatus which is useful in a high speed environment, especially if the quick release of a jammed document is desired.

One aspect of current design efforts in handling documents, like checks, for example, in financial data processing environments is to increase the throughput rate at which documents may be processed. In general, the documents are moved along a document track, to be delivered to various processing units or elements, like encoders, endorsers, and printers, for example, which are located along the track. When a document becomes accidentally jammed in the track while the document is being moved at a high rate, it tends to become crumpled before it can be removed. Many prior art systems utilize individual drive rollers and associated individual pinch rollers to move the document in a feeding direction; this construction makes removal of a jammed document difficult. Another problem with the prior art document transport mechanisms of the type mentioned is that they are expensive and time consuming to assemble.

SUMMARY OF THE INVENTION

In contrast with the prior art document transport discussed earlier herein, the present invention provides a low cost, simple document transport apparatus.

Another advantage of the apparatus of this invention is that it facilitates the removal of documents which become accidentally jammed in the document track.

A preferred embodiment of the document transport apparatus of this invention includes: a document track having first and second walls mounted in spaced parallel relationship to each other to provide a space therebetween for receiving a document; first and second drive rollers; first mounting means for mounting said first and second drive rollers to enable the peripheries of said first and second drive rollers to extend into the space between said first and second walls; first and second pinch rollers; second mounting means for mounting said first and second pinch rollers in driving engagement with said first and second drive rollers, respectively; said second mounting means comprising: a planar member having said first and second pinch rollers mounted thereon to be aligned with said first and second drive rollers, respectively, to move a document in a feeding direction along said track; said planar member having first and second extensions extending from opposed ends thereof; third and fourth mounting means for mounting said first and second extensions, respectively, on said first wall; said third mounting means having a first slotted member to receive said first extension to restrain said planar member to movement in a plane which is parallel to said feeding direction; said fourth mounting means having a second slotted member to receive said second extension to restrain said planar member to movement in said plane which is parallel to said feeding direction; and first and second resilient members mounted in said first and second slotted members to bias said first and second extensions toward said second wall to move said first and second pinch rollers into said driving engagement with said first and second drive rollers, respectively.

In another aspect, a preferred embodiment of the document transport apparatus of this invention includes: a document track having first and second walls mounted in spaced parallel relationship to each other to provide a space therebetween for receiving a document; first and second drive rollers; first mounting means for mounting said first and second drive rollers to enable the peripheries of said first and second drive rollers to extend into the space between said first and second walls; first and second pinch rollers; second mounting means for mounting said first and second pinch rollers for movement between a first position in which said first and second rollers are in driving engagement with said first and second drive rollers, respectively, and a second position in which said first and second pinch rollers are out of engagement with said first and second drive rollers; said second mounting means comprising: a planar member having said first and second pinch rollers mounted thereon to be aligned with said first and second drive rollers, respectively, to move a document in a feeding direction along said track when said first and second pinch rollers are in said first position, said planar member having first and second extensions extending form opposed ends thereof,and also having a camming surface thereon; third and fourth mounting means for mounting said first and second extensions, respectively, on said first wall; said third mounting means having a first slotted member to receive said first extension to restrain said planar member to movement in a plane which is parallel to said feeding direction; said fourth mounting means having a second slotted member to receive said second extension to restrain said planar member to movement in said plane which is parallel to said feeding direction; first and second resilient members mounted in said first and second slotted members to bias said first and second extensions toward said second wall to move said first and second pinch rollers to said first position; and a lever pivotally mounted on said first wall to engage said camming surface on said planar member to move said planar member away from said first wall to thereby move said first and second pinch rollers to said second position.

The previously named advantages, and others, will become more readily understood in connection with the following specification, claims, and drawing.

DETAILED DESCRIPTION OF THE INVENTION

Figure 1:
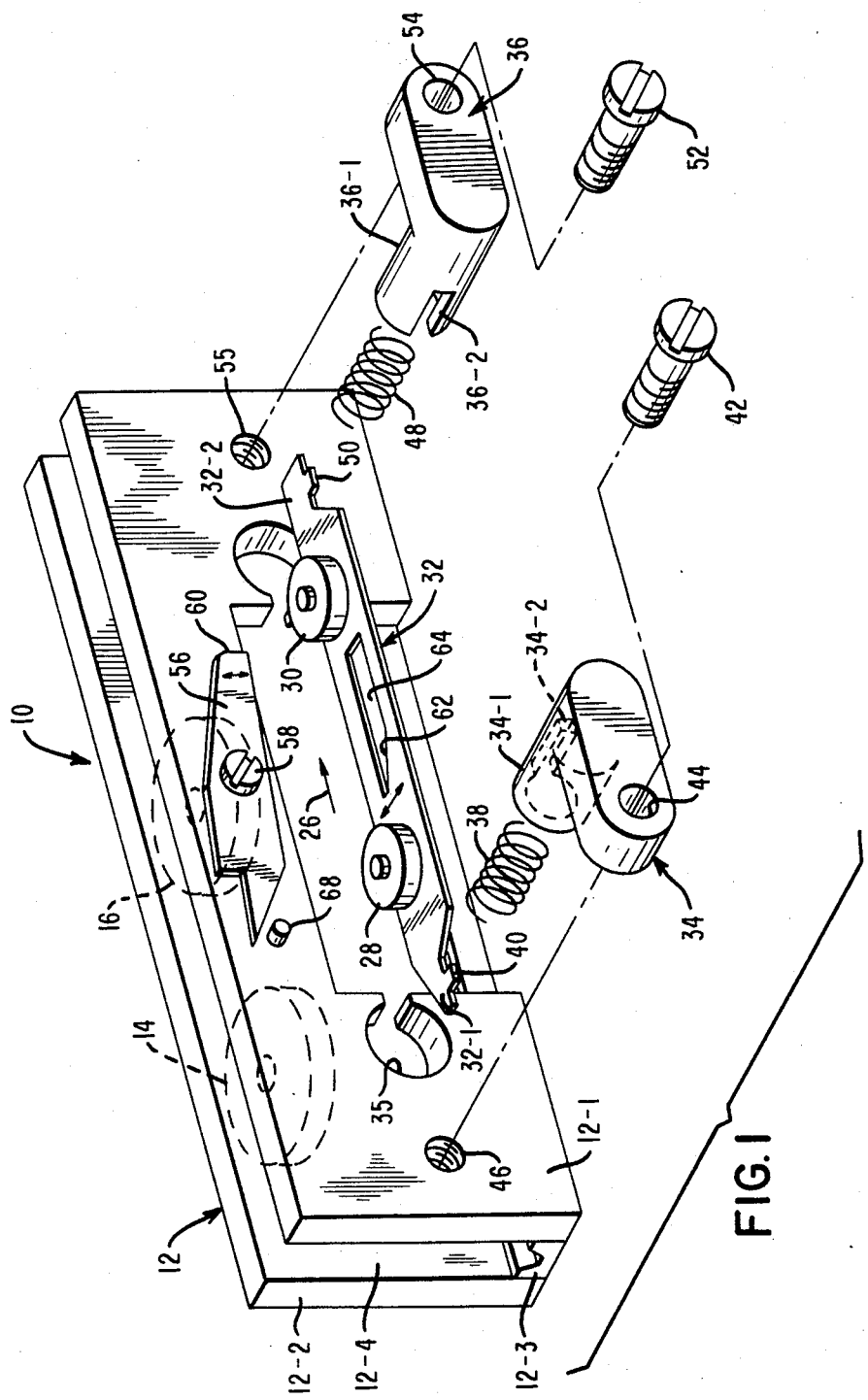
FIG. 1 is a general, exploded view, in perspective, of the apparatus of this invention.

FIG. 1 is a general, perspective view showing the apparatus of this invention which is designated generally as 10. The apparatus 10 includes a document track 12 which is composed of the first and second upstanding vertical walls 12-1 and 12-2 which are secured to the base 12-3, as shown, to provide a document receiving space 12-4 therebetween.

Figure 2:
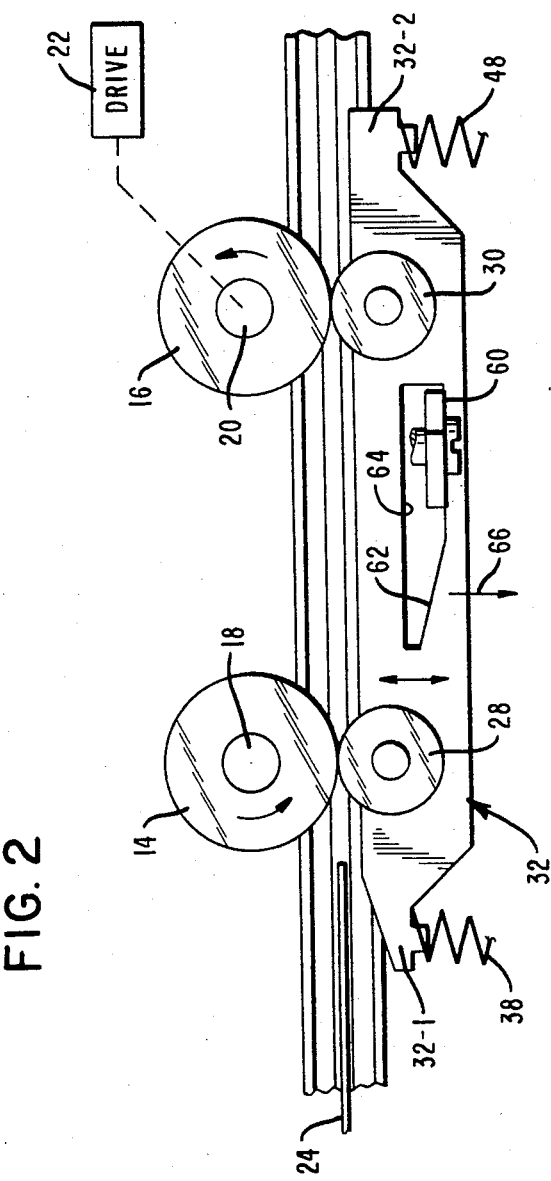
FIG. 2 is a plan view of the apparatus shown in FIG. 1, with certain elements of the apparatus being shown in diagrammatic form.

The apparatus 10 also includes first and second drive rollers 14 and 16 and mounting means to mount these rollers 14 and 16 so that their peripheries extend into the space 12-4 in the document track 12. The mounting means includes the shafts 18 and 20 (FIG. 2) on which the drive rollers 14 and 16 are mounted, respectively, and it also includes the drive 22 (FIG. 2) for rotating the shafts 18 and 20 as is conventionally done. The drive 22 rotates the drive rollers 14 and 16 in a counterclockwise direction (as viewed in FIG. 2) to move a document 24 in the feeding direction which is shown by arrow 26 in FIG. 1.

For each drive roller 14 and 16, there is provided an associated pinch roller 28 and 30, respectively. Second mounting means are provided for mounting the pinch rollers 28 and 30 for movement between a first position in which these pinch rollers are in driving engagement with the associated drive rollers 14 and 16 and a second position in which these pinch rollers are out of engagement with the associated drive rollers 14 and 16.

The second mounting means includes the planar member 32 on which the first and second pinch rollers 28 and 30 are mounted so that the peripheries of these pinch rollers are aligned with the peripheries of the drive rollers 14 and 16. The planar member 32 also has first and second extensions 32-1 and 32-2 extending from opposed ends thereof as shown best in FIG. 1. The second mounting means also includes third and fourth mounting means for mounting the first and second extensions 32-1 and 32-2 on the first wall 12-1.

The third mounting means includes the slotted member 34 (FIG. 1) which has a tubular cylindrical portion 34-1 having a slot 34-2 therein to receive the first extension 32-1 of the planar member 32. The first wall 12-1 has a hole 35 therein to receive the cylindrical portion 34-1 when the apparatus 10 is assembled. The axis of hole 35 is perpendicular to the feeding direction shown by arrow 26. The third mounting means also includes the compression-type resilient member or coil spring 38 which is housed in the tubular cylindrical portion 34-1, and the coil spring 38 is also retained on the first extension 32-1 by a tang or projection 40 which extends therefrom. The slotted member 34 is secured to the first wall 12-1 by a fastener 42 passing through the hole 44 in the slotted member 34 and being secured in the threaded hole 46.

The fourth mounting means mentioned is identical to the third mounting means just described and includes the slotted member 36 having the cylindrical portion 36-1 which has a slot 36-2 therein to receive the second extension 32-2 of the planar member 32. The coil spring 48 is retained in the cylindrical portion 36-1 and is also retained on the second extension by a projection 50 which extends therefrom. A fastener 52, passing through the hole 54, is used to secure the slotted member 36 to the first wall 12-1 via the threaded hole 55.

As previously stated, the second mounting means is used to mount the pinch rollers 28 and 30 for movement between a first position in which these pinch rollers are in driving engagement with the associated drive rollers 14 and 16, respectively, and a second position in which these pinch rollers are out of engagement. A lever 56 is used to switch or move the pinch rollers 28 and 30 between the first and second positions. The lever 56 is pivotally mounted on a pin 58 which is mounted in the first wall 12-1. When the lever is in the position shown in FIG. 1, the springs 38 and 48 bias the extensions 32-1 and 32-2 towards the second wall 12-2, and consequently, the pinch rollers 28 and 30 are in driving engagement with their associated drive rollers 14 and 16. In this situation, a document 24 passing between the drive rollers 14 and 16 and the associated pinch rollers 28 and 30 will be driven in the feeding direction of arrow 26.

When an accidental jam occurs, a document may get crumpled in the document track 12. To release the document, the lever 56 is moved in a clockwise direction as viewed in FIG. 1 to move the end 60 of the lever 56 to the position shown in FIG. 2. Continued movement of the lever 56 in this direction causes the end 60 to engage the camming surface 62 which forms one side of the opening 64 in the planar member 32. The camming surface 62 is located so that when it is engaged by the end 60 of lever 58 the resultant force, shown by arrow 66, will move both pinch rollers 28 and 30 away from their associated drive rollers 14 and 16 at approximately the same time. After the jammed document is removed, the lever 56 is rotated in a counterclockwise direction to remove the end 60 from the camming surface 62 and the hole 64, permitting the pinch rollers 28 and 30 to return to the engaging or first position; a limit stop 68, secured to the first wall 12-1, limits the rotation of the lever 56 in this direction.

The embodiment described permits the individual pinch rollers 28 and 30 to move somewhat independently, due to their individual springs 38 and 48, while the planar member 32 is restrained to move in a plane which is parallel to the direction of feeding shown by arrow 26. This feature keeps the pinch rollers 28 and 30 in a line contact with their associated drive rollers 14 and 16 to provide a consistent drive in moving documents.

What is claimed is:

1. A document transport apparatus comprising:
    a document track having first and second walls mounted in spaced parallel relationship to each other to provide a space therebetween for receiving a document;
    first and second drive rollers;
    first mounting means for mounting said first and second drive rollers to enable the peripheries of said first and second drive rollers to extend into the space between said first and second walls;
    first and second pinch rollers;
    second mounting means for mounting said first and second pinch rollers in driving engagement with said first and second drive rollers, respectively;
    said second mounting means comprising:
    a planar member having said first and second pinch rollers mounted thereon to be aligned with said first and second drive rollers, respectively, to move a document in a feeding direction along said track; said planar member having first and second extensions extending from opposed ends thereof;
    third and fourth mounting means for mounting said first and second extensions, respectively, on said first wall;
    said third mounting means having a first slotted member to receive said first extension to restrain said planar member to movement in a plane which is parallel to said feeding direction;
    said fourth mounting means having a second slotted member to receive said second extension to restrain said planar member to movement in said plane which is parallel to said feeding direction; and
    first and second resilient members mounted in said first and second slotted members to bias said first and second extensions toward said second wall to move said first and second pinch rollers into said driving engagement with said first and second drive rollers, respectively.

2. A document transport apparatus comprising:

a document track having first and second walls mounted in spaced parallel relationship to each other to provide a space therebetween for receiving a document;

first and second drive rollers;

first mounting means for mounting said first and second drive rollers to enable the peripheries of said first and second drive rollers to extend into the space between said first and second walls;

first and second pinch rollers;

second mounting means for mounting said first and second pinch rollers for movement between a first position in which said first and second rollers are in driving engagement with said first and second drive rollers, respectively, and a second position in which said first and second pinch rollers are out of engagement with said first and second drive rollers;

said second mounting means comprising:

a planar member having said first and second pinch rollers mounted thereon to be aligned with said first and second drive rollers, respectively, to move a document in a feeding direction along said track when said first and second pinch rollers are in said first position, said planar member having first and second extensions extending from opposed ends thereof, and also having a camming surface thereon;

third and fourth mounting means for mounting said first and second extensions, respectively, on said first wall;

said third mounting means having a first slotted member to receive said first extension to restrain said planar member to movement in a plane which is parallel to said feeding direction;

said fourth mounting means having a second slotted member to receive said second extension to restrain said planar member to movement in said plane which is parallel to said feeding direction;

first and second resilient members mounted in said first and second slotted members to bias said first and second extensions toward said second wall to move said first and second pinch rollers to said first position; and a lever pivotally mounted on said first wall to engage said camming surface on said planar member to move said planar member away from said first wall to thereby move said first and second pinch rollers to said second position.

3. The apparatus as claimed in claim 2 in which said first wall has first and second holes therein whose central axes are perpendicular to said feeding direction;

said first and second slotted members each having a cylindrical portion having a slot therein to receive the associated said first and second extensions therein, respectively, with the cylindrical portions of said first and second slotted members being mounted in said first and second holes, respectively;

said first and second resilient members being mounted in the associated cylindrical portion of said first and second slotted members, respectively, to bias said planar member towards said second wall.

4. The apparatus as claimed in claim 3 in which said planar member has an opening therein, with said camming surface forming one of the sides of said opening.

5. The apparatus as claimed in claim 4 in which said first and second extensions each have a projection extending therefrom to provide a center for retaining the associated first and second resilient members thereon.

* * * * *